United States Patent
Williams

(10) Patent No.: US 7,032,858 B2
(45) Date of Patent: Apr. 25, 2006

(54) SYSTEMS AND METHODS FOR IDENTIFYING TARGETS AMONG NON-TARGETS WITH A PLURALITY OF SENSOR VEHICLES

(75) Inventor: Darin S. Williams, Tucson, AZ (US)

(73) Assignee: Raytheon Company, Walthem, MA (US)

( * ) Notice: Subject to any disclaimer, the term of this patent is extended or adjusted under 35 U.S.C. 154(b) by 0 days.

(21) Appl. No.: 10/919,714

(22) Filed: Aug. 17, 2004

(65) Prior Publication Data

US 2006/0049974 A1    Mar. 9, 2006

(51) Int. Cl.
*F41G 7/00*  (2006.01)
*G06K 9/00*  (2006.01)
*G01S 13/88* (2006.01)

(52) U.S. Cl. ............... 244/3.15; 342/25 R; 342/52; 342/58; 342/61; 342/62; 342/63; 342/64; 342/89; 342/90; 342/175; 342/195; 701/1; 701/3; 701/200; 382/100; 382/103; 244/3.1; 244/3.16; 244/3.17

(58) Field of Classification Search .......... 244/3.1–3.3; 89/1.11; 701/1–18, 23–28, 200, 207, 213–223; 382/100, 103; 342/25 R–25 F, 52–64, 89, 342/90, 175, 192–197

See application file for complete search history.

(56) References Cited

U.S. PATENT DOCUMENTS

| | | | |
|---|---|---|---|
| 6,338,011 B1 * | 1/2002 | Furst et al. | 701/1 |
| 6,727,841 B1 * | 4/2004 | Mitra | 342/25 R |
| 6,842,674 B1 * | 1/2005 | Solomon | 701/23 |
| 6,867,727 B1 * | 3/2005 | Mitra | 342/59 |
| 6,910,657 B1 * | 6/2005 | Schneider | 244/3.11 |

* cited by examiner

*Primary Examiner*—Bernarr E. Gregory
(74) *Attorney, Agent, or Firm*—Thomas J. Finn; Leonard A. Alkov; Karl Vick

(57) ABSTRACT

A plurality of sensor vehicles collect imaging data from an assigned location of a target region having targets and non-targets. The imaging data may be combined based on its location and the combined data is matched to a threat object map to identify the actual targets from the non-targets. In some embodiments, the sensor vehicles may be redirected to collect velocity and/or range information on the identified targets.

41 Claims, 4 Drawing Sheets

SYSTEMS AND METHODS FOR IDENTIFYING TARGETS AMONG NON-TARGETS WITH A PLURALITY OF SENSOR VEHICLES

TECHNICAL FIELD

Embodiments of the present invention pertain to imaging systems and to target identification systems.

BACKGROUND

One problem with conventional imaging systems is that large fields-of-view are generally required to identify targets in a large uncertainty volume. For example, after its release from an interceptor booster, a kill vehicle may use on-board sensors to look for objects released by an attacking missile. The kill vehicles may collect data on the objects to try to determine which objects are mock warheads. One problem is that the kill vehicle's sensors can see only a very small area at any time; that is, it has a small field-of-view making it difficult to accurately distinguish targets from non-targets.

Thus there are general needs for systems and methods that can better distinguish targets from non-targets, especially in high closing-rate situations.

SUMMARY

A plurality of sensor vehicles collect imaging data from an assigned location of a target region that may have both targets and non-targets. The imaging data may be combined based on its location and the combined data is matched to a threat object map to identify the actual targets from the non-targets. In some embodiments, the sensor vehicles may be redirected to collect velocity and/or range information on the identified targets.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the invention may be referred to, individually or collectively, herein by the term "invention" merely for convenience and without intending to voluntarily limit the scope of this application to any single invention or inventive concept if more than one is in fact disclosed.

Figure 1:
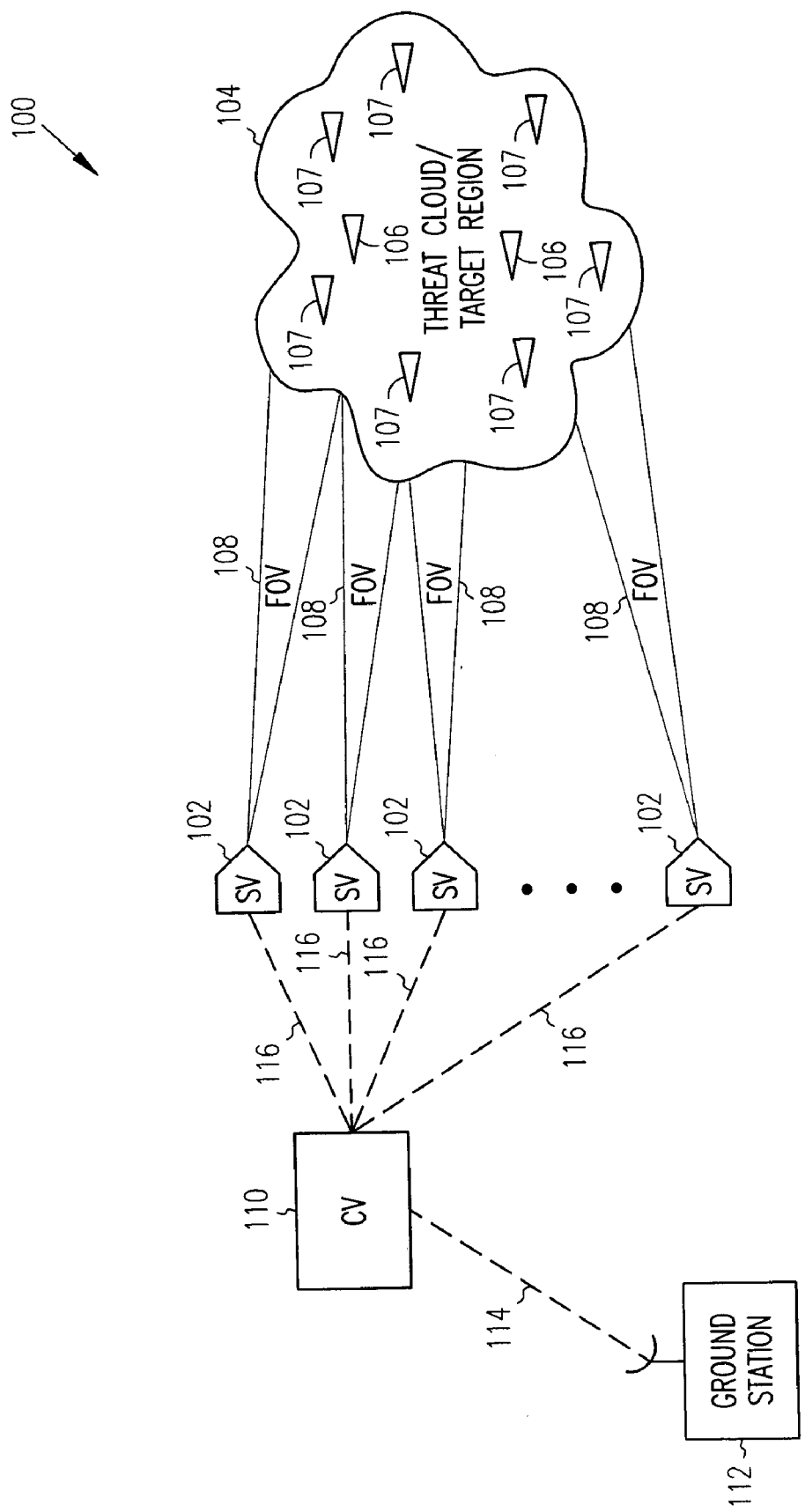
FIG. 1 illustrates an imaging system in accordance with some embodiments of the present invention.

FIG. 1 illustrates an imaging system in accordance with some embodiments of the present invention. Imaging system 100 may use sensor vehicles 102 to identify targets 106 from non-targets 107 in target region 104. In some embodiments, sensor vehicles 102 may be kill vehicles, targets 106 may be enemy missiles, non-targets 107 may be mock warheads, and system 100 may be part of a missile defense system, although the scope of the invention is not limited in this respect.

In some embodiments, sensor vehicles 102 may be deployed from carrier vehicle 110 to collect information from potential targets in a portion of target region 104. The information collected by the individual sensor vehicles may be combined and compared to a threat object map to determine matches to identify actual targets. Sensor vehicles 102 may then be directed to destroy the identified actual targets, although the scope of the invention is not limited in this respect.

In some embodiments, imaging system 100 may include a plurality of sensor vehicles 102 which may direct their sensors and receive images from an assigned location of target region 104. In some embodiments, each sensor vehicle 102 may generate a detection list when one of potential targets 106 is identified within field-of-view 108 of the associated sensor vehicle 102.

In some embodiments, system 100 may also include a processing station, such as ground station 112, to combine the detection lists to identify actual targets by comparison with an object map. In some embodiments, each detection list may include location coordinates and characteristics of one or more of potential targets 106. The processing station may combine the detection lists based on the location coordinates using a common inertial reference frame. The location coordinates may be associated with potential targets 106 within field-of-view 108 of an associated one of sensor vehicles 102. In some embodiments, a processing station may identify the actual targets by matching the characteristics from the combined detections lists with objects on the object map.

In some embodiments, sensor vehicles 102 may have a common reference frame and may direct an inertial vector to an assigned location of target region 104 based on the common reference frame. In these embodiments, the processing station may map target region 104 using the common reference frame. In some embodiments, the common reference frame may be a common inertial reference frame, although the scope of the invention is not limited in this respect.

In some embodiments, sensor vehicles 102 may collect the image data with an optical sensor from the assigned location. In some embodiments, the optical sensor may be an infrared sensor and the image data may comprise infrared image data, although the scope of the invention is not limited in this respect.

In some embodiments, each of sensor vehicles 102 may have field-of-view 108 to collect the image data from the assigned location of target region 104. The fields-of-view together from the plurality of sensor vehicles 102 may substantially cover at least a portion of the target region. In some embodiments, sensor vehicles 102 may have a much smaller field-of-view than a field-of-view that carrier vehicle 110 may need to have to cover the same portion of target region 104. In some embodiments, the assigned locations of target region 104 may be different locations or at least partially non-overlapping locations within target region 104.

In some embodiments, sensor vehicles 102 may transmit their detection lists to a processing station for combining and the identification of actual targets. In some embodiments, the sensor vehicles 102 may transmit their detection lists to carrier vehicle 110, and carrier vehicle 110 may transmit the detection lists to ground station 112 for processing. In other embodiments, carrier vehicle 110 may combine the detection lists to identify the actual targets. In other embodiments, sensor vehicles 102 may share their detection lists and may together perform the combining to identify actual targets.

In some embodiments, carrier vehicle 110 may carry the plurality of sensor vehicles 102 on board. In these embodiments, sensor vehicles 102 may be released from carrier vehicle 110 prior collecting image data, although the scope of the invention is not limited in this respect. In some embodiments, carrier vehicle 110 may be launched from the ground to allow sensor vehicles 102 to collect imaging data. In some embodiments, carrier vehicle 110 may be an interceptor booster, although the scope of the invention is not limited in this respect.

In some embodiments, carrier vehicle 110 and sensor vehicles 102 may communicate over communication links 116, and carrier vehicle 110 and ground station 112 may communicate over link 114. In other embodiments, sensor vehicles 102 may communication directly with ground station 112 over links (not illustrated).

In some embodiments, target region 104 may comprise a threat cloud comprising one or more targets 106 and one or more non-targets 107. The threat cloud may be a three-dimensional region in space corresponding to a threat object map (TOM). In some embodiments, the threat object map may be a map of the threat cloud generated by ground station 112, although the scope of the invention is not limited in this respect. In some embodiments, there may be very few actual targets 106 compared to the number of non-targets 107. For example, out of one hundred or more potential targets, only five may be actual targets 106 while up to ninety-five may be non-targets 107. In some embodiments, target region 104 may be in Earth's atmosphere, such as the exo-atmosphere, although the scope of the invention is not limited in this respect.

In some embodiments, some of sensor vehicles 102 may include a feature extractor to extract features from the image data to distinguish the potential targets 106 from potential non-targets 107. In these embodiments, potential non-targets 107 may have predetermined features and the feature extractor may eliminate the potential non-targets 107 based on these features when generating the detection lists. In some embodiments, the features that distinguish potential targets from potential non-targets may be optical features. Examples of such features may include position, size and color as well as other features. In some embodiments, features used to distinguish potential targets from potential non-targets include features used by conventional single field-of-view systems.

In some embodiments, a processing station, such as ground station 112, may instruct at least some of sensor vehicles 102 to redirect their sensors to collect additional data such as range and/or velocity data, on one or more of the identified targets. This is discussed in more detail below with reference to FIG. 3.

In some embodiments, system 100 may further use carrier vehicle 110 to collect additional information on the identified targets. For example, carrier vehicle 110 may direct an on-board sensor to collect range and/or velocity information on one or more of the identified targets. In some embodiments, carrier vehicle 110 may use a laser sensor (not illustrated) to collect more precise range and/or velocity information on the identified targets. In some embodiments, this additional information may be used for matching to a threat object map. In some embodiments, this additional information may be used in tasking the sensor vehicles toward the actual targets for possible intercept, although the scope of the invention is not limited in this respect.

In some embodiments, once one or more actual targets are identified, the processing station may instruct at least some of sensor vehicles 102 toward at least some of the identified targets. In some embodiments, the inertial vectors of at least some of sensor vehicles 102 may be directed to the identified targets within the threat cloud. In some embodiments, sensor vehicles 102 may use their sensors to intercept the identified targets, although the scope of the invention is not limited in this respect. In some embodiments, location information for the identified targets may be transmitted to sensor vehicles 102 (e.g., through carrier vehicle 110) to allow sensor vehicles 102 to redirect their inertial vectors to an assigned one or more of the identified targets. In other embodiments, inertial vector information may be transmitted to sensor vehicles 102 and sensor vehicles 102 may redirect their inertial vectors to an assigned one or more of identified targets 106.

In some embodiments, sensor vehicles 102 may, for example, comprise kinetic energy kill vehicles, miniature kill vehicles, explosive kill vehicles, space vehicles or spacecraft, guided missiles, or guided projectiles, although the scope of the invention is not limited in this respect. In some embodiments, sensor vehicles 102 may destroy one or more of the identified targets by coming into contact with the target (i.e., through the use of kinetic energy). In other embodiments, sensor vehicles 102 may carry an explosive charge and may explode when within a predetermined range of one or more of the targets, although the scope of the invention is not limited in this respect.

Figure 2:
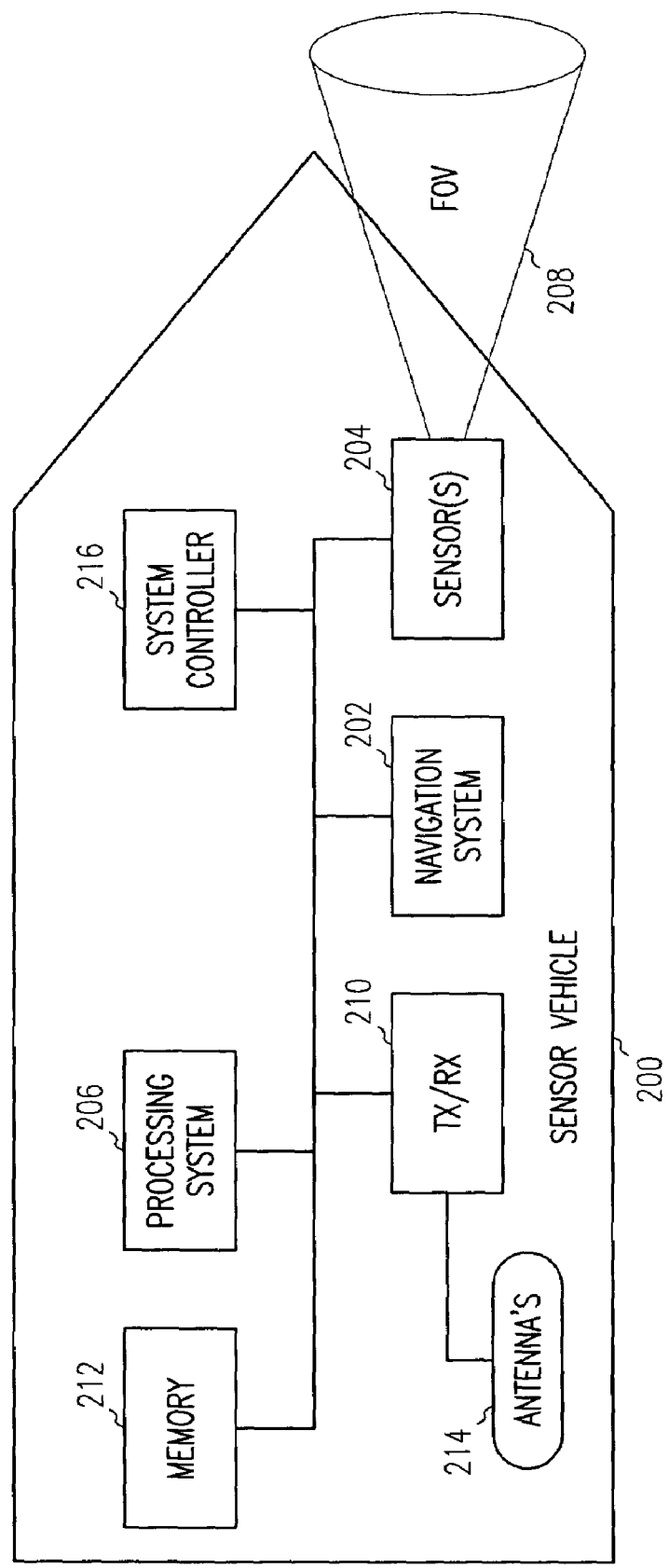
FIG. 2 is a functional block diagram of a sensor vehicle in accordance with some embodiments of the present invention.

FIG. 2 is a functional block diagram of a sensor vehicle in accordance with some embodiments of the present invention. Sensor vehicle 200 may be suitable for use as any one of sensor vehicles 102 (FIG. 1), although other sensor vehicle configurations may also be suitable.

Sensor vehicle 200 may comprise navigation system 202 to control the direction of sensor vehicle 200, and one or more sensors 204 to receive image information within field-of-view 208. In accordance with some embodiments, navigation system 202 may direct sensor vehicle 200 so that one or more of sensors 204 may receive images from an assigned location of a target region. In some embodiments, sensor vehicle 200 may comprise processing system 206. Processing system 206 may generate a detection list when a potential target is identified within field-of-view 208. In some embodiments, objects with a distinctive signature as compared to the background may be identified as a potential target. In some embodiments, potential targets may be identified using techniques consistent with conventional field-of-view systems.

In some embodiments, navigation system 202 may be responsive to inertial vectors. In these embodiments, navigation system 202 may direct an inertial vector of the sensor vehicle to an assigned location, and processing system 206 may generate the detection lists by mapping the target region to a common inertial reference frame used by other sensor vehicles. In some embodiments, sensors 204 may comprise optical sensors, although the scope of the invention is not limited in this respect. In some embodiments, sensors 204 may include infrared sensors.

In some embodiments, sensor vehicle 200 may also comprise transceiver 210 and antennas 214 to communicate with a carrier vehicle, such as carrier vehicle 110 (FIG. 1). In some embodiments, transceiver 210 may communicate with other sensor vehicles and/or a ground station, although the scope of the invention is not limited in this respect. In some embodiments, transceiver 210 and antennas 214 may be used to transmit the detection lists to a processing station and may be used to receive directional information from a carrier vehicle for navigation system 202 to direct an inertial vector of sensor vehicle 200 to an assigned location, although the scope of the invention is not limited in this respect.

In some embodiments, processing system 206 may include a feature extractor to extract features from the collected image data to distinguish the potential targets from potential non-targets. The potential non-targets may have predetermined features stored in memory 212. In some embodiments, the feature extractor may help eliminate the potential non-targets when generating the detection lists. System controller 216 may coordinate the activities of the sensor vehicle 200.

In some embodiments, navigation system 202 may redirect sensor vehicle 200 to collect additional information, such as range and/or velocity data, on one or more of the identified targets. This is discussed in more detail below.

In some embodiments, navigation system 202 may redirect sensor vehicle 200 toward one of the identified targets for possible intercept. In some embodiments, the inertial vectors of sensor vehicle 200 may be directed to the identified objects within the threat cloud. In some embodiments, the sensor vehicle 200 may use sensors 204 to track and/or destroy the identified targets, although the scope of the invention is not limited in this respect. In some embodiments, location information for the identified targets may be transmitted to sensor vehicle 200 to allow sensor vehicle 200 to redirect inertial vectors to an assigned one or more of the identified targets. In other embodiments, inertial vector information may be transmitted to sensor vehicle 200 and navigation system 202 may redirect inertial vectors to an assigned one or more of the identified targets.

Figure 3:
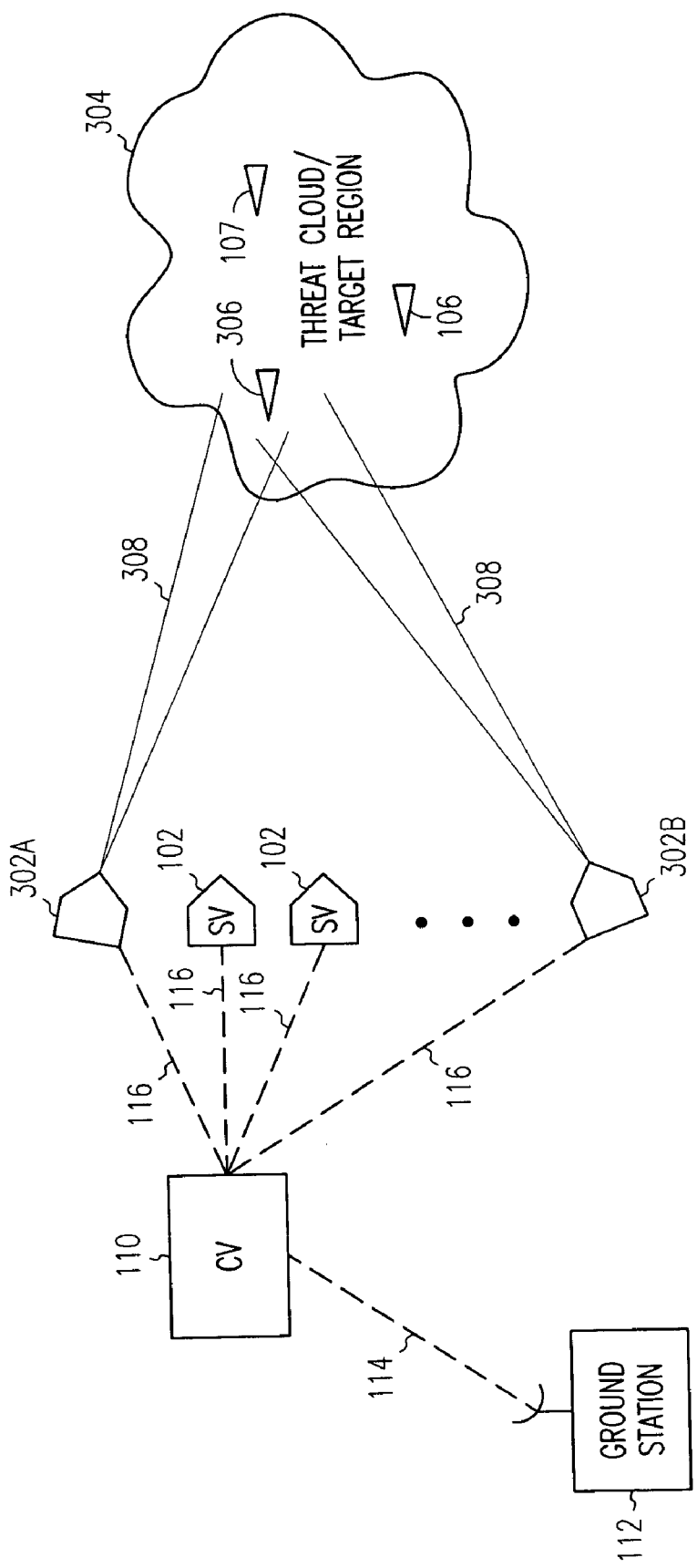
FIG. 3 illustrates the collection of ranging and/or velocity information by an imaging system in accordance with some embodiments of the present invention.

FIG. 3 illustrates the collection of ranging information by an imaging system in accordance with some embodiments of the present invention. In some embodiments, the sensors of a sensor vehicle may be redirected to collect velocity data on the identified targets. In some embodiments, this additional information may be used for matching to a threat object map. In some embodiments, two or more of sensor vehicles (e.g., 302a and 302b) may perform "stereoscopic ranging" to further enhance matching of one or more targets 306 within a region of threat cloud 304. In these embodiments, two or more of sensor vehicles (e.g., 302a and 302b) may be re-oriented and/or have their sensors reconfigured to look (i.e., direct field-of-view 308) across threat cloud 304. Stereoscopic ranging may help reduce ambiguities among the targets after the initial match, which was based primarily on two-dimensional imagining information.

Although system 100 (FIG. 1) and vehicle 200 (FIG. 2) are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein.

Figure 4:
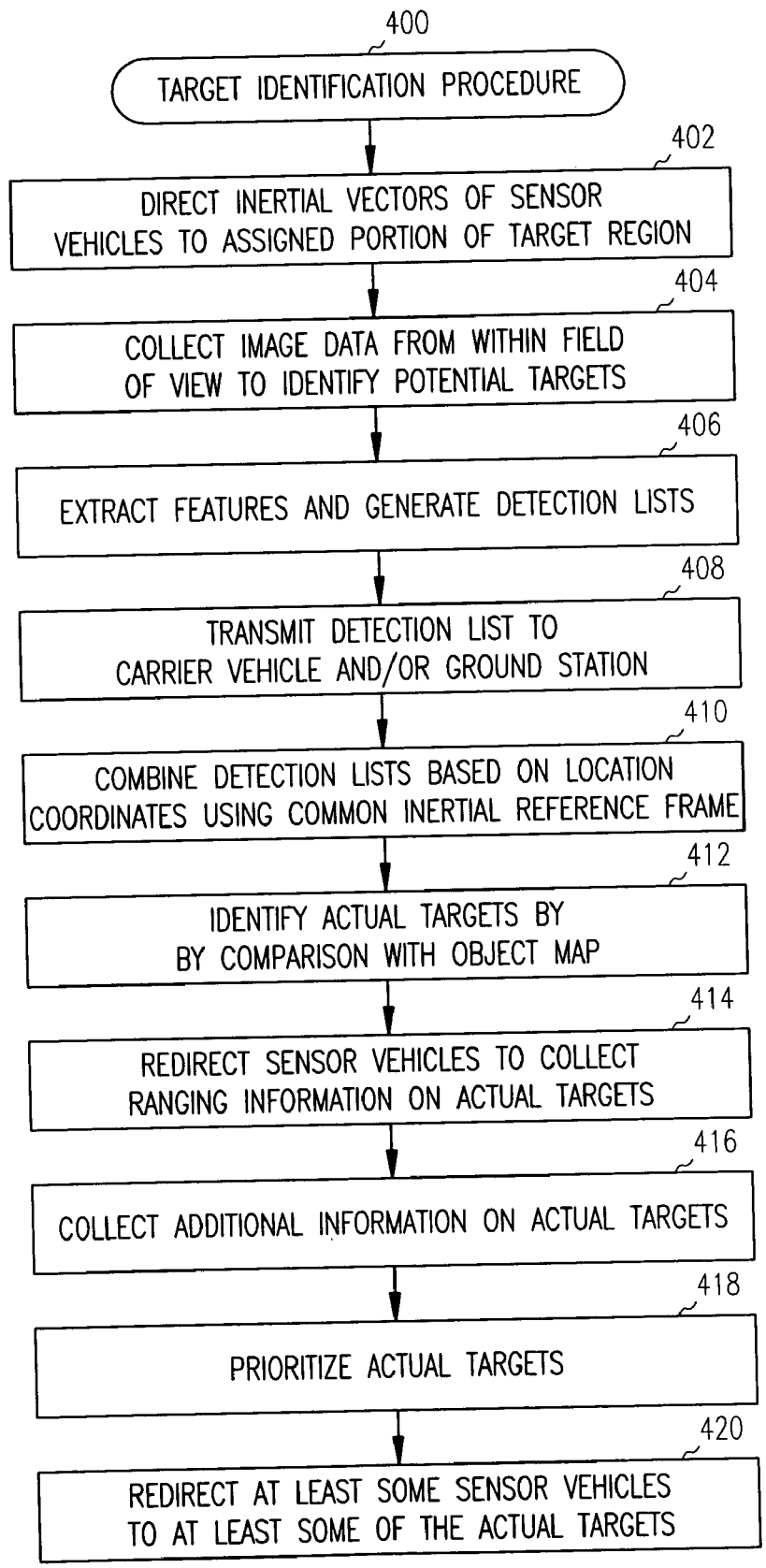
FIG. 4 is a flow chart of a target identification procedure in accordance with some embodiments of the present invention.

FIG. 4 is a flow chart of a target identification procedure in accordance with some embodiments of the present invention. Target identification procedure 400 may be performed by a target identification system or an imaging system, such as system 100 (FIG. 1), although other systems may also perform procedure 400. In some embodiments, target identification procedure 400 may be performed to identify actual targets from non-targets. In distributed-processing embodiments, discussed in more detail below, some operations of procedure 400 may be performed collectively by more than one of the sensor vehicles, such as sensor vehicles 102 (FIG. 1).

Operation 402 comprises directing sensors of a plurality of sensor vehicles toward an assigned portion of a target region. In some embodiments, a sensor vehicle may be directed toward an assigned portion of the threat region to allow their sensors to collect image data. In some embodiments, the assigned portions may be substantially non-overlapping and may be determined to substantially cover the threat region from a two-dimensional perspective.

Operation 404 comprises collecting image data from within a field-of-view of each of the sensor vehicles to identify potential targets.

Operation 406 comprises extracting features from the collected image data and generating detection lists. The detection lists may include location information and characteristics for each potential target. In some embodiments, potential targets having known features may be eliminated by performing the feature extraction.

Operation 408 comprises transmitting the detection lists to a processing station. In some embodiments, operation 408 comprises transmitting the detection lists to a carrier vehicle which may transmit the detection lists to a processing station. In other embodiments, operation 408 may comprise transmitting the detection lists directly to a processing station, which may be a carrier vehicle, a ground station or one or more of the sensor vehicles.

Operation 410 comprises combining the detection lists received from the plurality of sensor vehicles based on the location coordinates using a common reference frame. In some embodiments, operation 410 may generate a detection map representing the target region.

Operation 412 comprises identifying actual targets within a target region by matching the potential targets from the combined detection lists with objects on a threat object map. In some embodiments, the threat object map may have been generated by a ground station prior to the performance of operation 402, although the scope of the invention is not limited in this respect. In some embodiments, operation 412 may comprise matching the detection map generated in operation 410 with the ground-generated threat object map to identify actual targets.

In some embodiments, operation 414 may be performed. Operation 414 comprises redirecting the sensor vehicles to collect additional information, such as range and/or velocity information, on the identified targets.

In some embodiments, operation 416 may be performed. Operation 416 comprises collecting additional information, such as range and/or velocity information, on the identified targets by the carrier vehicle. Because the location of the actual targets may be known, the carrier vehicle may direct a more accurate sensor, such as a laser sensor, to determine the velocity and/or range of the identified targets.

In some embodiments, operation 418 may be performed. Operation 418 may comprise prioritizing the identified targets for possible interception. In some embodiments, targets that have a higher probability of being actual targets may be prioritized. In some embodiments, targets may be prioritized based on the range and/or velocity information collected in operations 414 and/or 416.

Operation 420 comprises redirecting at least some of the sensor vehicles toward one or more of the identified targets for possible interception. In some embodiments, more than one sensor vehicle may be directed to an identified target, and in other embodiments, one sensor vehicle may be directed to more than one target. In some embodiments, sensor vehicles may be directed to targets having a higher priority from operation 418, although the scope of the invention is not limited in this respect.

In distributed-processing embodiments of the present invention, operation 408 may be refrained from being performed and the processing of operations 410 through 412 may be shared by more than one of the sensor vehicles. In these embodiments, detection lists may be shared among the sensor vehicles for identification of actual targets. In some distributed-processing embodiments, one or more of operations 414 through 420 may be performed collectively by more than one of the sensor vehicles.

Although the individual operations of procedure 400 are illustrated and described as separate operations, one or more of the individual operations may be performed concurrently, and nothing requires that the operations be performed in the order illustrated.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

What is claimed is:

1. A method comprising:
   directing sensors in a plurality of sensor vehicles to receive images from differing substantially non-overlapping assigned locations of a target region;
   generating detection lists by any one or more of the sensor vehicles when a potential target is identified within a field-of-view of the one or more sensor vehicles; and
   combining the detection lists to identify actual targets by comparison with an object map.

2. The method of claim 1 wherein each detection list includes location coordinates and characteristics of the potential targets,
   wherein combining comprises combining the detection lists based on the location coordinates using a common inertial reference frame, and
   wherein the location coordinates are associated with potential targets within the field-of-view of an associated sensor vehicle.

3. The method of claim 2 further comprising identifying actual targets by matching the characteristics from the combined detections lists with objects on the object map.

4. The method of claim 1 wherein directing comprises directing an inertial vector of each of the sensor vehicles to an associated one of the assigned locations, wherein the sensor vehicles have a common reference frame, and
   wherein generating the detection lists comprises mapping the target region to the common reference frame.

5. The method of claim 1 further comprising collecting image data with an optical sensor from an associated one of the assigned locations.

6. The method of claim 5 wherein the optical sensor is an infrared sensor and the image data comprises infrared image data.

7. The method of claim 1 wherein each of the plurality of sensor vehicles has a field-of-view to collect image data from an associated one of the assigned locations of the target region, and
   wherein fields-of-view together from the plurality of sensor vehicles substantially cover at least a portion of the target region.

8. The method of claim 7 wherein the target region comprises a threat cloud comprising one or more targets and one or more non-targets, the threat cloud being a three-dimensional region in space corresponding to a threat object map (TOM),
   wherein the threat object map is a map of the threat cloud generated by a ground station.

9. The method of claim 8 further comprising:
   extracting features from the image data to distinguish the potential targets from potential non-targets, the potential non-targets having predetermined features; and
   eliminating the potential non-targets when generating the detection lists.

10. The method of claim 9 further comprising transmitting the detection lists to a processing station for the combining and the identifying.

11. The method of claim 9 further comprising distributing the combining and identifying amongst the plurality of sensor vehicles.

12. The method of claim 1 further comprising redirecting the sensors of at least some of the sensor vehicles to collect ranging data on one or more of the identified targets.

13. The method of claim 1 further comprising redirecting at least some of the sensor vehicles toward at least some of the identified targets for interception.

14. The method of claim 13 wherein the sensor vehicles comprise at least one of either kinetic energy kill vehicles, miniature kill vehicles, explosive kill vehicles, space vehicles or spacecraft, guided missiles, or guided projectiles.

15. A system for identifying targets from non-targets comprising:
a plurality of sensor vehicles to direct sensors and receive images from differing substantially non-overlapping assigned locations of a target region, the sensor vehicles to generate detection lists when a potential target is identified within a field-of-view of the one or more sensor vehicles; and
a processing station to combine the detection lists to identify actual targets by comparison with an object map.

16. The system of claim 15 wherein each detection list includes location coordinates and characteristics of the potential targets,
wherein the processing station combines the detection lists based on the location coordinates using a common inertial reference frame, and
wherein the location coordinates are associated with potential targets within the field-of-view of an associated one of the sensor vehicles.

17. The system of claim 16 wherein the processing station identifies actual targets by matching the characteristics from the combined detections lists with objects on the object map.

18. The system of claim 15 wherein the sensor vehicles have a common inertial reference frame and direct an inertial vector to an associated one of the assigned locations, and
wherein the processing station maps the target region to the common inertial reference frame.

19. The system of claim 15 wherein the sensor vehicles collect image data with an optical sensor from an associated one of the assigned locations.

20. The system of claim 19 wherein the optical sensor is an infrared sensor and the image data comprises infrared image data.

21. The system of claim 15 wherein each of the plurality of sensor vehicles has a field-of-view to collect image data from the assigned location of the target region, and
wherein fields-of-view together from the plurality of sensor vehicles substantially cover at least a portion of the target region.

22. The system of claim 21 wherein the target region comprises a threat cloud comprising one or more targets and one or more non-targets, the threat cloud being a three-dimensional region in space corresponding to a threat object map (TOM),
wherein the threat object map is a map of the threat cloud generated by a ground station.

23. The system of claim 22 wherein at least some of the sensor vehicles include a feature extractor to extract features from the image data to distinguish the potential targets from potential non-targets, the potential non-targets having predetermined features, the feature extractor to eliminate the potential non-targets when generating the detection lists.

24. The system of claim 23 further comprising a transmitter to transmit the detection lists to the processing station.

25. The system of claim 23 wherein the detections list are distributed amongst the sensor vehicles and the sensor vehicles combine the detection lists to identify the actual targets by performing distributed processing.

26. The system of claim 15 wherein the processing station instructs at least some of the sensor vehicles to redirect their sensors to collect ranging data on one or more of the identified targets.

27. The system of claim 15 further comprising a carrier vehicle, the carrier vehicle to direct an on-board sensor to collect at least one of either range and velocity information on one or more of the identified targets for interception, and
wherein the processing station is to instruct at least some of the sensor vehicles toward at least some of the identified targets.

28. The system of claim 27 wherein the sensor vehicles comprise at least one of either kinetic energy kill vehicles, miniature kill vehicles, explosive kill vehicles, space vehicles or spacecraft, guided missiles, or guided projectiles.

29. A sensor vehicle comprising:
a navigation system to direct a sensor to receive images from one of plurality of substantially non-overlapping assigned locations of a target region; and
a processing system to generate a detection list when a potential target is identified within a field-of-view of the sensor vehicle,
wherein the detection list is combined with detection lists from other sensor vehicles of a plurality of sensor vehicles to identify actual targets by comparison with an object map.

30. The vehicle of claim 29 wherein each detection list includes location coordinates and characteristics of the potential targets,
wherein the detection lists are combined based on the location coordinates using a common inertial reference frame,
wherein the location coordinates are associated with potential targets within the field-of-view of an associated sensor vehicle.

31. The vehicle of claim 30 wherein a processing station identifies actual targets by matching the characteristics from the combined detections lists with objects on the object map.

32. The vehicle of claim 29 wherein the navigation system directs an inertial vector of the sensor vehicle to the assigned location, wherein the plurality of sensor vehicles have a common inertial reference frame, and
wherein processing system generates the detection lists by mapping the target region to the common inertial reference frame.

33. The vehicle of claim 29 further comprising an optical sensor to collect the image data from the assigned location.

34. The vehicle of claim 33 wherein the optical sensor is an infrared sensor and the image data comprises infrared image data.

35. The vehicle of claim 29 wherein sensor vehicle has a field-of-view to collect image data from the assigned location of the target region, and
wherein fields-of-view of the plurality of target vehicles together substantially cover at least a portion of the target region.

36. The vehicle of claim 35 wherein the target region comprises a threat cloud comprising one or more targets and one or more non-targets, the threat cloud being a three-dimensional region in space corresponding to a threat object map (TOM), and
wherein the threat object map is a map of the threat cloud generated by a ground station.

37. The vehicle of claim 36 wherein the processing system comprises a feature extractor to extract features from the image data to distinguish the potential targets from potential non-targets, the potential non-targets having predetermined features, the feature extractor to eliminate the potential non-targets when generating the detection lists.

38. The vehicle of claim 37 further comprising a transceiver to transmit the detection lists to a processing station and to receive directional information from a carrier vehicle for the navigation system to direct an inertial vector of the sensor vehicle to the assigned location.

39. The vehicle of claim 37 further comprising distributing the combining and identifying amongst the plurality of sensor vehicles.

40. The vehicle of claim 29 wherein the navigation system further redirects the sensor vehicle to collect ranging data on one or more of the identified targets.

41. The vehicle of claim 29 wherein the navigation system redirects the sensor vehicle toward one of the identified targets for interception, and wherein the sensor vehicle comprises at least one a kinetic energy kill vehicle, a miniature kill vehicle, an explosive kill vehicle, a space vehicle or a spacecraft, a guided missile, or a guided projectile.

* * * * *